March 24, 1964  R. D. KING  3,125,988
FARROWING STALL
Filed Oct. 1, 1959  2 Sheets-Sheet 1
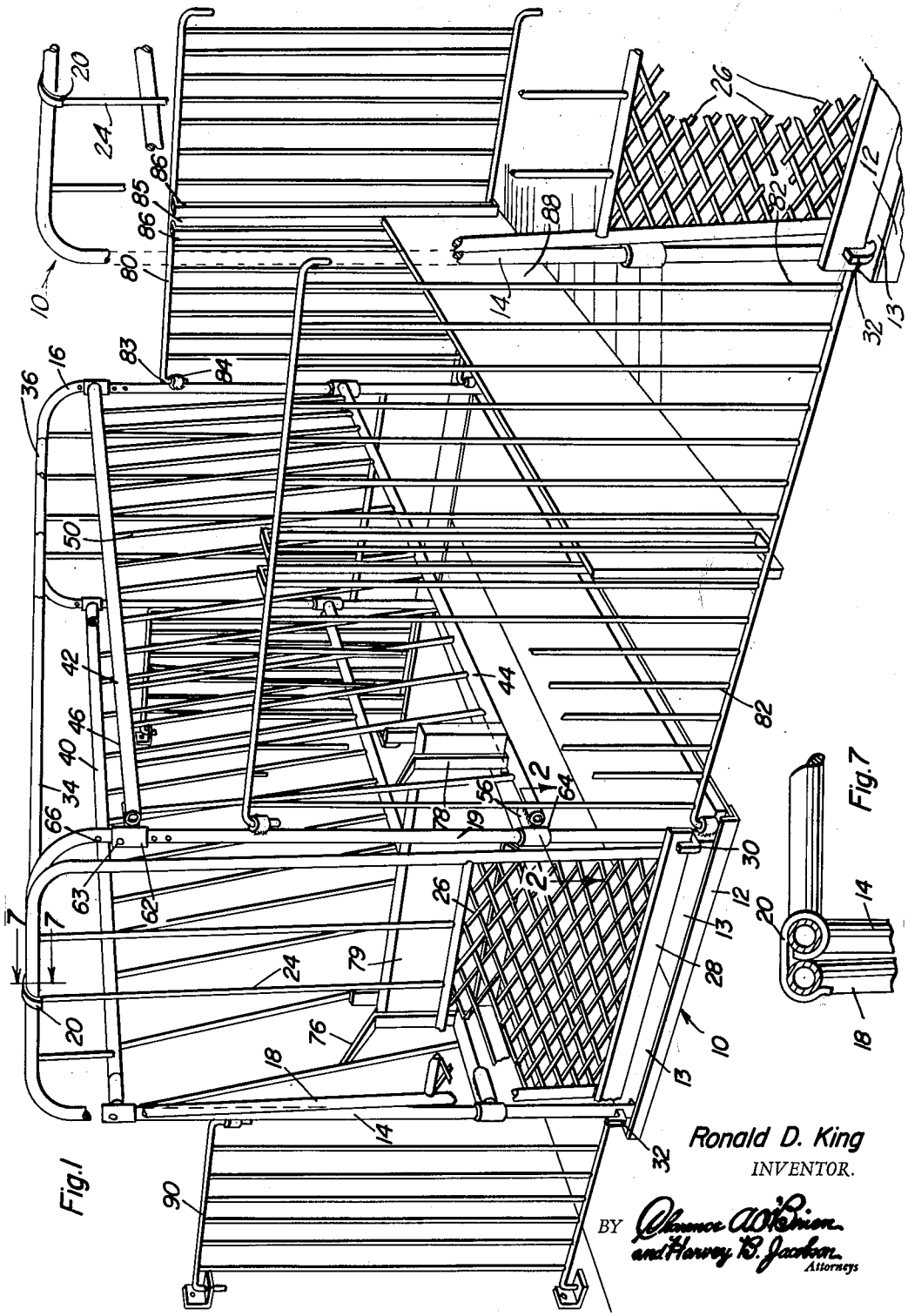
Ronald D. King
INVENTOR.

March 24, 1964     R. D. KING     3,125,988
FARROWING STALL
Filed Oct. 1, 1959                          2 Sheets-Sheet 2
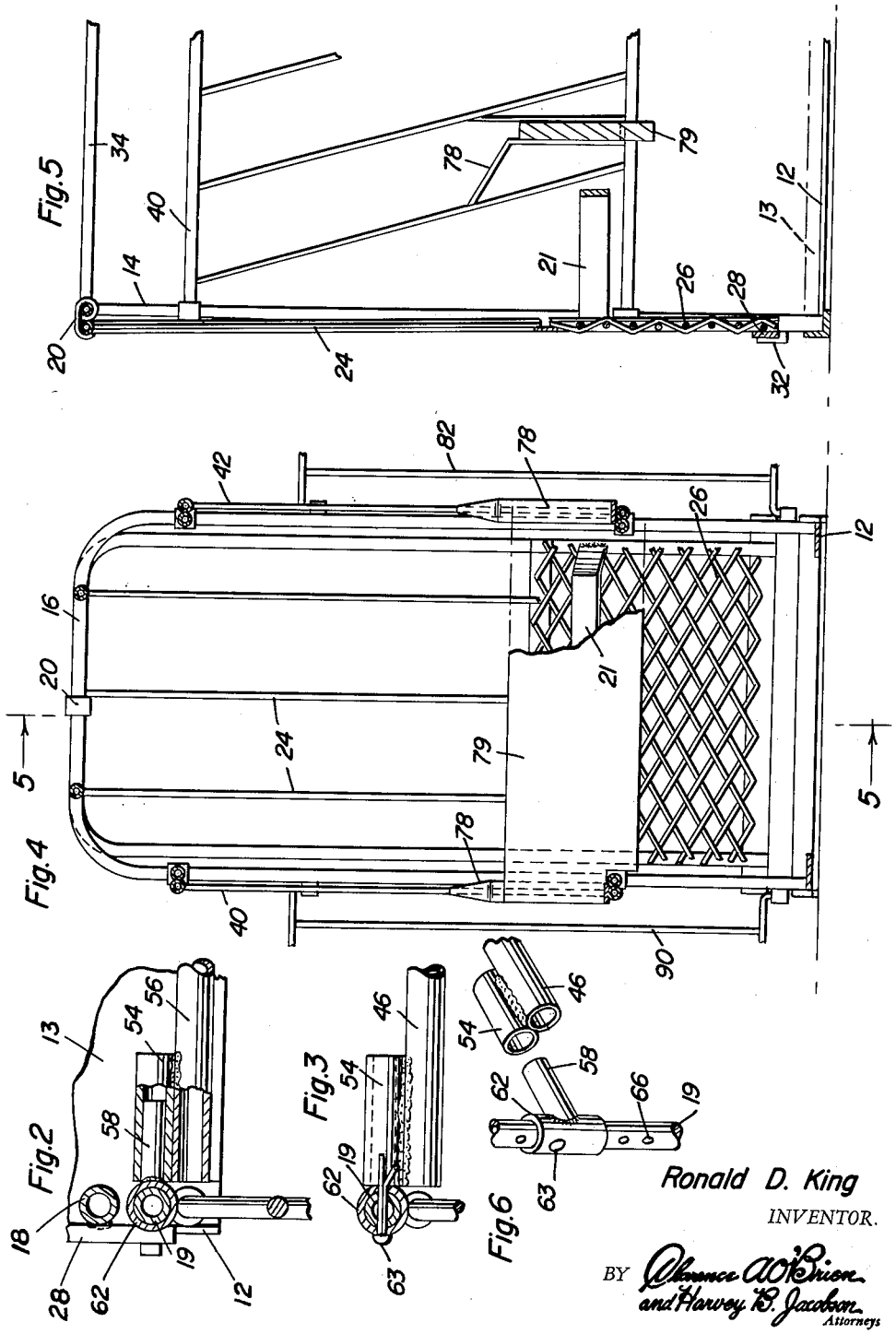
Ronald D. King
INVENTOR.

United States Patent Office 3,125,988
Patented Mar. 24, 1964

3,125,988
FARROWING STALL
Ronald D. King, Winfield, Iowa
(Rte. 5, Mount Pleasant, Iowa)
Filed Oct. 1, 1959, Ser. No. 843,840
6 Claims. (Cl. 119—20)

This invention relates to a farrowing stall and more particularly to a pen to prevent high loss of small pigs at farrowing time.

An object of the invention is to provide a farrowing stall which is easily collapsed and erected, and which serves the intended purpose of protecting the pigs at farrowing time very effectively, there being means especially provided for this purpose in the stall.

A further object of the invention is to provide a practical, easily used farrowing stall. Although previous stalls have been constructed, they have numerous drawbacks. For instance, the previous stalls are equipped with hinged gates, and more times than not, the gate is hinged on the wrong side i.e. the side making it more difficult to handle the sow depending on the position of the sow. The gates of the instant farrowing stall are completely removable. Further, there are incorporated a number of adjustments in the farrowing stall, making it usable under various operating conditions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the farrowing stall showing it in place.

FIGURE 2 is an enlarged fragmentary sectional view taken on the line 2—2 of FIGURE 1.

FIGURE 3 is a sectional view showing a detail of construction.

FIGURE 4 is a vertical sectional view of the central portion of the stall looking towards the front thereof.

FIGURE 5 is a fragmentary vertical sectional view taken on the line 5—5 of FIGURE 4 and showing the floor planks in broken lines.

FIGURE 6 is a perspective view of the means for adjusting the elevation of the sides.

FIGURE 7 is an enlarged sectional view taken on the line 7—7 of FIGURE 1.

In the accompanying drawings reference is first made to FIGURE 1 wherein a pair of farrowing stalls 10 are illustrated. Each farrowing stall 10 is made especially of metal rods and tubing with a base frame 12 with planks 13 forming a floor held down by gravity. There is a front and rear frame 14 and 16 respectively each secured at its lower end to frame 12, the front frame containing an optional gate 18 equipped with gate latch 20 at the upper part and an inwardly extending bumper 21 at the lower part thereof. Gate 18 is essentially rectangular and has bars 24 at the upper part thereof together with a lower perforate panel 26. Expanded metal or like material may be used for constructing this panel. Lower strip 28 fixed to the bottom of the gate projects laterally outwardly from the sides thereof a short distance, but sufficient to be removably seated in the upwardly opening hooks 30 and 32 which are fixed in the sides of frame 14. Accordingly, gate 18 is removable by simply unlatching it i.e. swinging the hook-type latch 20 to an open position, and lifting it slightly.

The front and rear frames 14 and 16 are secured rigidly together by means of upper frame members 34 and 36 which are secured to the top part of the front and rear frame members 14 and 16 respectively.

There are two substantially identical sides or side-panels 40 and 42 extending between the side members of the front and rear frames 14 and 16. Side 42 is shown in detail and as is illustrated, the side is vertically adjustable so that the space between the lower member 44 of side 42 and the bottom frame 12 may be adjusted. Side 42 is made of lower frame member 44, upper member 46, and a plurality of spaced connecting bars 50 secured to members 44 and 46.

The means for adjusting the height of the sides 40 and 42 are seen best in FIGURES 2, 3 and 6. Sides 44 and 46 each have small sections of pipe or tubing welded thereto. For instance, the front ends of sides 44 and 46 have short pipes 54 and 56 welded thereto in order to receive pins 58 and 60, the pins respectively being attached to collars 62 and 64. The collars are vertically slidable on the side member 19 of frame 14, and the upper collar 62 is held in place by a single cotter pin 63 extending through a hole in collar 62 and a selected aperture in the group of apertures 66 in side member 19. It is now evident that the sides are easily vertically adjusted and they are easily removed by simply removing the cotter pins and separating the side parts.

A pair of upwardly opening saddles 76 and 78 are secured to the lower side member 44 and to the corresponding lower side member 45 of side 40. These upwardly opening saddles accommodate a bumper board 79 having the lower corners thereof notched so that it sets down slightly within the confines of members 44 and 45.

Front and rear fence panels 80 and 82, each of rod construction, are separably attached to the members 19 of the front and rear frames 14 and 16 by means of pins 83 entering upwardly opening bearings 84 of members 19. Vertical rails 85 are formed by adjacent strips 86 welded or otherwise secured to panels 80 and 82 in order to receive a wide board 88 which separates the litter from the pigs of the next adjacent litter. Panel 90 on the opposite side of the pen is used for the same purpose or for an end stall (FIGURE 1) it simply attaches to a wall.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A farrowing stall for a sow comprising the combination of a front frame and a rear frame, a door separably connected with said front frame, rigid means operatively connecting said front and rear frame to reinforce said frames, a floor connected to said front and rear frames and having planks thereon to accept the weight of the sow whereby the frame is anchored by friction between the planking and the ground, a pair of sides, means adjustably securing said sides to said front and rear frames comprising sleeves on the ends of said sides slidable on vertically extending frame members and pins slidably extending through selected apertures in said sleeves and members so that the spacing between the lower edges of said sides from said floor is rapidly adjustable, said sides being easily separable from said front and rear frames, a bumper board having notches below each end, and open ended saddle means connected with said sides for supporting said bumper board transversely across said sides, said notches receiving the bottom portion of said saddle.

2. A farrowing stall as defined in claim 1 wherein the frame members, the door and the sides are composed substantially of metal rods and tubing.

3. A plurality of farrowing stalls as defined in claim 1 arranged in a row in side-by-side relationship and parallel to one another, adjacent sides of each pair of adjacent stalls being connected at their ends to vertically extending panels which extend between the adjacent sides, a vertical separation board extending between the central portion of each pair of said panels and parallel to said sides for forming two adjacent pig pens between each farrowing stall.

4. The structure defined in claim 3 wherein the ends of said panels have projections extending downwardly therefrom each slidably received in a sleeve fixed to the corner of said stall.

5. A farrowing stall for a sow comprising the combination of a front frame and a rear frame, a door separably connected with said front frame, rigid means operatively connecting said front and rear frame to reinforce said frames, a floor supported on said rigid means, said floor comprising planks to support the weight of the sow whereby the floor is anchored by friction between the rigid means and a ground surface, a pair of sides, means adjustably securing said sides to said front and rear frames so that the spacing between the lower edges of said sides from said floor is rapidly adjustable, said sides being easily separable from said front and rear frames, a bumper board, and means connected with said sides for supporting said bumper board transversely across said sides, said means for adjustably securing said sides to said front and rear frames including collars slidably disposed on said side members of said front and rear frames, pin means operatively connecting said collars to said side frame members to hold said sides in selected elevated positions, and studs fixed to said collars extending perpendicular thereto and removably received in apertures in the ends of said sides.

6. A farrowing stall comprising the combination of a front frame and a rear frame, a door separably connected with said front frame, rigid means interconnecting and reinforcing said front and rear frames, a pair of sides, said sides and frames forming, in conjunction with a supporting surface, a complete enclosure, means adjustably securing said sides to said front and rear frames comprising portions on the ends of said sides slidable on vertically extending frame members and selectively fixedly engaged therewith so that the spacing between the lower edges of said sides and the supporting surface is variable, said sides being easily separable from said front and rear frames, a bumper board, an open ended saddle means connected with said sides for supporting said bumper board transversely across said sides.

References Cited in the file of this patent
UNITED STATES PATENTS

| | | |
|---|---|---|
| 1,230,237 | Sturn | June 19, 1917 |
| 2,255,806 | Overson | Sept. 16, 1941 |
| 2,630,097 | Johansen | Mar. 3, 1953 |
| 2,729,196 | Breitenbach | Jan. 3, 1956 |
| 2,993,471 | Meyer | July 25, 1961 |
| 3,042,000 | McMurray et al. | July 3, 1962 |